United States Patent
Leonarski et al.

(10) Patent No.: US 12,424,952 B2
(45) Date of Patent: Sep. 23, 2025

(54) POSITION SENSING AND CONTROL IN A HYBRID SYSTEM

(71) Applicant: Cummins Inc., Columbus, IN (US)

(72) Inventors: Jaroslaw Leonarski, Columbus, IN (US); Wei Juin Choy, Columbus, IN (US); Shyam Sunder Padhy, Columbus, IN (US); Zachary Ryan Gheaja, Columbus, IN (US)

(73) Assignee: Cummins Inc., Columbus, IN (US)

( * ) Notice: Subject to any disclaimer, the term of this patent is extended or adjusted under 35 U.S.C. 154(b) by 294 days.

(21) Appl. No.: 18/089,328

(22) Filed: Dec. 27, 2022

(65) Prior Publication Data

US 2023/0208325 A1    Jun. 29, 2023

Related U.S. Application Data

(60) Provisional application No. 63/294,017, filed on Dec. 27, 2021.

(51) Int. Cl.
*H02P 6/16* (2016.01)

(52) U.S. Cl.
CPC ..................... *H02P 6/16* (2013.01)

(58) Field of Classification Search
CPC ........ H02P 6/16; H02P 2203/03; H02P 21/18; H02P 8/08; G05B 2219/37317
See application file for complete search history.

(56) References Cited

U.S. PATENT DOCUMENTS

| | | | |
|---|---|---|---|
| 5,721,486 A | 2/1998 | Pape | |
| 6,891,348 B2 | 5/2005 | Bartolotti | |
| 9,531,310 B2 | 12/2016 | Lee et al. | |
| 10,135,369 B2 | 11/2018 | Brown et al. | |
| 10,720,862 B2 | 7/2020 | Kim et al. | |

(Continued)

FOREIGN PATENT DOCUMENTS

| | | |
|---|---|---|
| DE | 102010001166 A1 | 7/2011 |
| EP | 1604219 A1 | 12/2005 |

(Continued)

*Primary Examiner* — Bickey Dhakal
(74) *Attorney, Agent, or Firm* — Faegre Drinker Biddle & Reath LLP

(57) ABSTRACT

Embodiments include a method for operating a hybrid machine system including an electric machine coupled to an engine and an inverter in an offset determination mode, and in an operating mode when the electric machine is in a loaded electrical state. Operating the machine system in the offset determination mode may include (1) receiving mechanical angular position information representative of mechanical angular positions of the electric machine, (2) receiving electrical angular position information representative of electrical angular positions of electric signals in the electric machine when the electric machine is operating in an unloaded electrical state, (3) determining an offset between the mechanical angular positions and the electrical angular positions, and (4) storing the offset. Operating the machine system in an operating mode may include (1) receiving the mechanical angular position information, (2) generating machine control signals based on the mechanical angular position information and the stored offset, and (3) applying the machine control signals to the inverter.

19 Claims, 5 Drawing Sheets

(56) References Cited

U.S. PATENT DOCUMENTS

| | | | | |
|---|---|---|---|---|
| 2002/0173902 | A1* | 11/2002 | Haimerl | F01L 1/38 |
| | | | | 701/115 |
| 2003/0210006 | A1* | 11/2003 | Kusaka | H02P 6/182 |
| | | | | 318/437 |
| 2004/0046517 | A1 | 3/2004 | Kim | |
| 2004/0257027 | A1* | 12/2004 | Matsuo | H02P 21/26 |
| | | | | 318/722 |
| 2010/0264862 | A1* | 10/2010 | Kitagawa | H02P 6/16 |
| | | | | 318/400.13 |
| 2011/0130996 | A1* | 6/2011 | Blind | H02P 6/182 |
| | | | | 702/94 |
| 2020/0200036 | A1 | 6/2020 | Petersen et al. | |

FOREIGN PATENT DOCUMENTS

| | | | | |
|---|---|---|---|---|
| EP | 3346601 | A1 * | 7/2018 | H02K 29/08 |
| KR | 20040022949 | A | 3/2004 | |
| WO | 2004079385 | A1 | 9/2004 | |

* cited by examiner

POSITION SENSING AND CONTROL IN A HYBRID SYSTEM

REFERENCE TO RELATED APPLICATION

This application claims the benefit of U.S. Provisional Application Ser. No. 63/294,017 filed on Dec. 27, 2021 and entitled Position Sensing and Control in a Hybrid Machine System, which is incorporated herein in its entirety and for all purposes.

FIELD

This disclosure relates generally to hybrid machine systems including an engine and an electric machine such as a motor/generator. In particular, the disclosure relates to control systems for hybrid machine systems.

BACKGROUND

Hybrid machine systems including an internal combustion engine coupled to an alternating current (AC) electrical machine such as a motor and/or generator are used in a wide variety of applications including industrial settings and motor vehicles. In these systems the electrical machine is coupled to a power source (e.g., when operating as a motor in a motoring mode) or to an electrical load (e.g., when operating as a generator in a regenerating mode) though an inverter. The inverter (which may be integrated into the electrical machine) is controlled by a machine control system in response to input commands. When the AC machine is operating as a motor, the motor control system causes the inverter to switch and apply power from the power source to the motor in a controlled manner, and to cause the motor to provide a commanded output. For example, in response to a torque input command, the machine control system will cause the motor to deliver the requested torque at the motor shaft. When the AC machine is operating as a generator, the machine control system causes the inverter to switch and couple power from the AC machine to the electrical load (e.g., operating as a power storage device).

The machine control system may make use of feedback from the AC machine and/or engine. Hall sensors and resolvers are examples of feedback devices that are commonly used to generate and provide feedback signals representative of the operation (e.g., speed and/or position) of the AC machine or engine. A Hall sensor, for example, is positioned to detect magnetic or other elements on a wheel or other structure that is mounted to and rotates with the drive shaft of the engine or the rotor shaft of the AC machine. The Hall sensor provides pulsed or otherwise time varying output signals in response to the rotation of the AC machine or engine.

There remains, however, a need for improved hybrid machine systems and associated control systems. In particular, there is a need for improvements that enhance the operation of the machine systems, simply system architecture and to reduce installation and overall system costs. Such improvements that can be efficiently implemented would be especially desirable.

SUMMARY

Disclosed embodiments include hybrid machine systems and associated control systems including improved feedback and control algorithms. The improvements enhance the operational characteristics of the machine systems, and can be efficiently implemented.

One example is a method for operating a hybrid machine system including an electric machine coupled to an engine and an inverter. The method comprises operating the hybrid machine system in an offset determination mode, and operating the hybrid machine system in an operating mode when the electric machine is in a loaded electrical state. In embodiments, operating the machine system in the offset determination mode includes (1) receiving mechanical angular position information representative of mechanical angular positions of the electric machine, (2) receiving electrical angular position information representative of electrical angular positions of electric signals in the electric machine when the electric machine is operating in an unloaded electrical state, (3) determining an offset between the mechanical angular positions and the electrical angular positions based on the mechanical angular position information and the electrical angular position information, and (4) storing the offset. Operating the machine system in an operating mode when the electric machine is in a loaded electrical state includes (1) receiving the mechanical angular position information representative of the mechanical angular positions of the electric machine, (2) generating machine control signals based on the mechanical angular position information and the stored offset, and (3) applying the machine control signals to the inverter.

In some embodiments, receiving the mechanical angular position information includes receiving information including an index representative of 360° rotation of a rotor of the electric machine with respect to a stator of the electric machine.

In embodiments, operating the hybrid machine system when the electric machine is in the unloaded electrical state includes switching the inverter off, and operating the hybrid machine system when the electric machine is in the loaded electrical state includes controlling the inverter with the machine control signals.

In embodiments, generating the machine control signals includes generating the machine control signals based on the mechanical angular position signals as the sole signals representative of the mechanical angular positions of the electric machine. The machine control signals may be produced by a single Hall sensor.

Another example is a hybrid machine system comprising an internal combustion engine, an AC electric machine coupled to the internal combustion engine, an inverter coupling the AC electric machine to a power source or load, a first feedback system for providing mechanical angular position information representative of mechanical angular positions of the AC electric machine, a second feedback system providing electrical angular position information representative of electrical angular positions of electrical signals in the AC electric machine, and a machine control system coupled to the inverter, first feedback system and second feedback system. The machine control system is configured to (1) determine mechanical angular positions of the AC electric machine based on the mechanical angular position information, (2) switch the inverter off and determine electrical angular positions of the AC electric machine based on the electrical angular position information when the AC electric machine is in an unloaded electrical state, (3) determine and store an offset based on the mechanical angular positions and the electrical angular positions, (4) generate machine control information based on the mechanical angular positions and the stored offset, and (5) switch the inverter on and operate the electric machine in a loaded electrical state based on the machine control information.

In some embodiments, the first feedback system comprises a rotating member including elements coupled to and rotating with the AC electric machine, and a Hall sensor to sense the elements on the rotating member. The rotating member may be coupled to a rotor of the electric machine. The rotating member may be mounted to a rotor of the AC electric machine. The rotating member may be mounted to a crank of the internal combustion engine. The rotating member may include an index representative of 360° rotation of the rotating member.

In embodiments, the first feedback system is a sole system providing mechanical angular position information representative of mechanical angular positions of the AC electric machine. The first feedback system may comprise a Hall sensor. The first feedback system may comprise a single Hall sensor.

Another example is a controller for a hybrid machine system of the type including an AC electric machine coupled to an inverter and an internal combustion engine. The controller may be configured to (1) determine mechanical angular positions of the AC electric machine based on mechanical angular position information, (2) switch the inverter off and determine electrical angular positions of the AC electric machine based on electrical angular position information when the AC electric machine is in an unloaded electrical state, (3) determine and store an offset based on the mechanical angular positions and the electrical angular positions, (4) generate machine control information based on the mechanical angular positions and the stored offset, and (5) switch the inverter on and operate the AC electric machine in a loaded electrical state based on the machine control information.

In embodiments, the mechanical angular positions are the sole mechanical angular positions used to generate the machine control information. The mechanical angular position information may be based on a signal provided by a Hall sensor. The mechanical angular position information may be based on a signal provided by a single Hall sensor. The mechanical angular position information may be based on a signal provided by a single Hall sensor.

DETAILED DESCRIPTION

Figure 1:
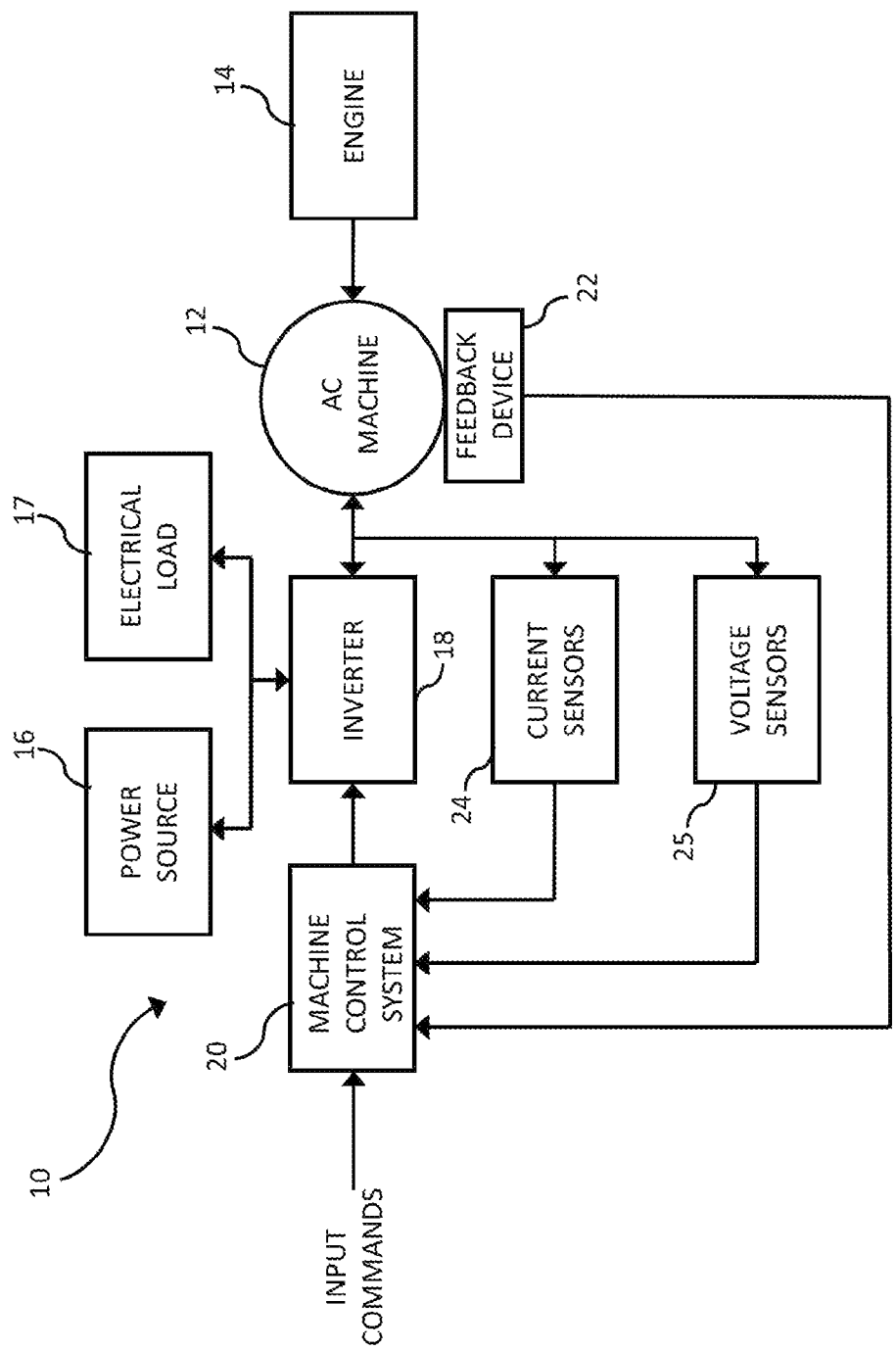
FIG. 1 is a diagrammatic illustration of a hybrid machine system in accordance with embodiments.

FIG. 1 is a diagrammatic illustration of a hybrid machine system 10 including an AC machine 12 mechanically coupled to an internal combustion engine 14 in accordance with embodiments. The AC machine 12 is electrically coupled to a power source 16 and/or an electrical load 17 by an inverter 18. Inverter 18 is responsive to the outputs of a machine control system 20, and controls the flow of electrical energy between the AC machine 12 and the power source 16 and electrical load 17. A feedback device 22 provides feedback signals representative of certain mechanical operating characteristics of the AC machine 12, such information representative of angular positions and rotation of a rotor or shaft of the AC machine. In addition to control input commands such as a torque request and the feedback signals provided by the feedback device 22, machine control system 20 is coupled to receive feedback signals representative of certain electrical operating characteristics or parameters of the AC machine 12. In the embodiments illustrated in FIG. 1, for example, current sensors 24 provide sensed current signals to the machine control system 20, and voltage sensors 25 provide sensed voltage signals to the machine control system.

In embodiments, AC machine 12 is a multiphase electric machine having a rotor and a stator. One or both of the rotor and stator of the AC machine 12 includes windings. Any of a wide variety of known or otherwise conventional AC machines 12 may be incorporated into the hybrid machine system 10. For example, AC machine 12 may be a permanent magnet (PM) motor and/or generator (referred to as a motor/generator), an induction motor/generator, or a synchronous motor/generator.

Power source 16 can include a battery, fuel cell, conventional power grid or any other energy source suitable for the AC machine 12 and its application, and is a direct current (DC) source in embodiments. For example, power source 16 may be a battery for a hybrid electric vehicle including the hybrid machine system 10. When incorporated into an electric vehicle or other applications, the AC machine 12 may be operated as a motor to generate force applied to the drive train coupled to drive wheels (not shown) of the vehicle. When the AC machine 12 is operated as a motor, the machine control system 20 generates control signals that cause the inverter 18 to switch and apply electrical energy from the power source 16 to the AC machine in a controlled manner.

Alternatively or additionally, the AC machine 12 may be operated as a generator. For example, the AC machine 12 may be operated as a generator during regeneration mode operation when driven by the drive train in electric vehicle applications, or when driven by the engine 14 as an auxiliary power source. When the AC machine 12 is operated as a generator, the machine control system 20 generates control signals that cause the inverter 18 to switch and couple electrical energy from the AC machine to the electrical load 17 in a controlled manner. In electric vehicle applications, for example, the electrical load 17 may be electrical auxiliary components such as pumps, fans, compressors or rechargeable power sources.

The machine control system 20 generates voltage drive commands that are coupled to the inverter 18 and used by the inverter to control the flow of electrical power between the AC machine 12 and power source 16 and/or electrical load 17. For example, when the AC machine 12 is operating as a motor, inverter 18 processes the voltage drive commands and applies the commanded voltages to the windings of the AC machine. The voltage drive commands may be pulse-width modulated (PWM) signals. In this operating mode the applied voltages create torque-producing currents in the windings of the AC machine 12 that result in rotation of the machine rotor or shaft. Similarly, when the AC machine 12 is operating as a generator, the voltage drive commands cause the energy generated by the AC machine to be coupled to the electrical load 17. In other embodiments the inverter 18 can couple power produced by the AC machine 12 operating as a generator to other electrical components, such as for example other electric motors (not shown). Inverter 18 can be of any known or otherwise conventional design. Such inverters 18 commonly include a plurality of power transistors or other switches to provide the PWM drive signals. In embodiments, the inverter 18 may be a component of the AC machine 12 or otherwise incorporated into the AC machine.

Current sensors 24 are coupled to the AC machine 12 and provide signals representative of the currents in the windings of the AC machine. Current sensors 24 can be any known or otherwise conventional devices. In embodiments, current sensors 24 provide information representative of the magnitude or levels of the currents on the windings of machine 12. Voltage sensors 25 are coupled to the AC machine 12 and provide signals representative of the voltages on the windings of the AC machine. Voltage sensors 25 can be any known or otherwise conventional devices. The signals provided by the voltage sensors 25 may be representative of the AC back electromotive force (BEMF) voltages (which are a function of the speed and rotor position of the AC machine 12), and therefore the angular positions of the electrical signals on the windings of the AC machine (e.g., electric or "real" angular positions of the AC machine). For example, and as described in greater detail below, the BEMF voltages may be measured by the voltage sensors 25 when the inverter 18 is switched Off and the AC machine 12 is not coupled to power source 16 or electrical load 17. Other embodiments use other devices to provide information representative of the electrical operating characteristics of the AC machine 12.

Feedback device 22 provides information representative of the relative rotation and/or angular positions of the rotor and stator of the AC machine 12 (e.g., the mechanical angular positions of the AC machine). As described in greater detail below, in embodiments, the signals provided by the feedback device 22 include an index indicia that represents one common location of the 360° rotation of the rotor with respect to the stator of the AC machine 12. In embodiments, feedback device 22 is the sole or only component providing information representative of the angular positions and/or rotational speed of the AC machine 12 used by the machine control system 20.

Figure 2:
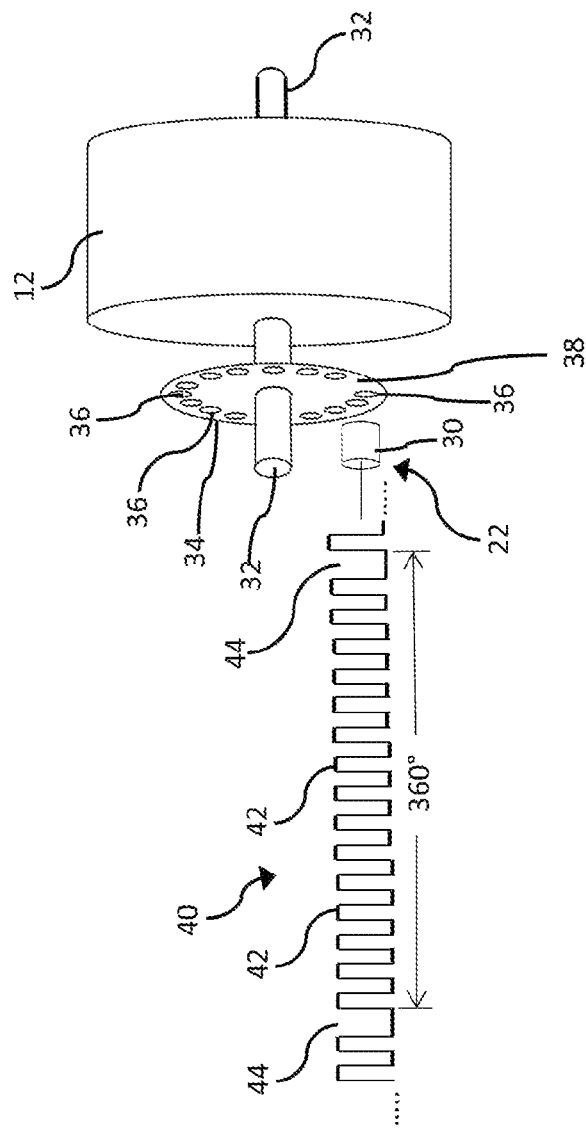
FIG. 2 is a diagrammatic illustration of the AC machine and feedback device shown in FIG. 1, in accordance with embodiments.

FIG. 2 is a diagrammatic illustration of an exemplary feedback device 22 in the form of a Hall sensor 30 that provides mechanical angular position signals in accordance with embodiments. The AC machine 12, and its rotor shaft 32, are also shown for purposes of illustration in FIG. 2. In the illustrated embodiments the Hall sensor 30 is positioned with respect to a structure such as wheel 34 mounted to the rotor shaft 32 of the AC machine 12. Wheel 34 includes a plurality of teeth, holes or other elements 36 circumferentially spaced about the wheel at generally evenly radially spaced-apart positions. At an index position or location 38 on the wheel 34, one or more of the elements 36 is not present, thereby indicating one location about the 360° circumference of the wheel. In embodiments, the wheel 34 may be mounted to the rotor shaft 32 of the AC machine 12 at a predetermined position so that the location 38 is at a known angular location on the rotor shaft (e.g., during manufacture or assembly of the hybrid machine system 10). In other embodiments the wheel 34 may be mounted to the rotor shaft 32 of the AC machine with the location 38 not at a predetermined angular location on the rotor shaft. Wheel 34 rotates with the rotor shaft 32.

FIG. 2 also includes a diagrammatic representation of the mechanical angular position signals 40 produced by the Hall sensor 30 as the wheel 34 rotates with the rotor shaft 32 of the AC machine 12. In the illustrated embodiments the angular position signals 40 include a series of pulses 42, where each of the pulses is generated in response to the movement of one of the elements 36 over the Hall sensor 30. Angular position signals 40 provide information representative of the angular position and rotational speed of the rotor shaft 32 of AC machine 12. Because the wheel 34 includes the index location 38 (e.g., where one or more of the elements 36 is not present), the angular position signals 40 include an index 44, in the form of a lack of or missing one or more pulses in the illustrated embodiments, that occurs once during each 360° rotation of the rotor shaft 32 and wheel 34. In embodiments where the wheel 34 is mounted to the rotor shaft 32 at a predetermined position, index 44 may represent a predetermined rotational position of the rotor shaft 32 in AC machine 12. Hall sensors such as 30 and wheels such as 34 are generally known and commercially available, and with the exception of the index location 38 on the wheel, can be of any known or otherwise conventional design. Other embodiments include other feedback devices and associated components to provide information representative the 360° rotation and/or index 44.

Machine control system 20 is configured to receive a control input command. For example, when the AC machine 12 is operating as a motor, the machine control system 20 may receive input commands specifying a desired amount of torque to be produced by the AC machine. Machine control system 20 processes the control input command and feedback signals provided by the feedback device 22, current sensors 24 and/or voltage sensors 25 to produce the voltage drive signals that are applied to the inverter 18. Machine control system 20 produces the voltage drive signals based on field oriented or other control algorithms that use information provided by the feedback device 22, current sensors 24 and/or voltage sensors 25. In embodiments, machine control system 20 implements flux-weakening (FW) and maximum-torque-per-ampere (MTPA) or other control algorithms to produce the voltage drive signals based on the input command and the feedback signals. FW and MTPA algorithms and field oriented control algorithms are generally known, and any such conventional or otherwise known algorithm suitable for the application of the hybrid machine system 10 may be used.

During regular or operating mode operation of the hybrid machine system 10 (e.g., with AC machine 12 operating as a motor or a generator), the inverter 18 couples electrical power between the AC machine 12 and the power source 16 or electrical load 17. Inverter 18 is turned On by the machine control system 20 during these operating mode operations, causing the AC machine 12 to be operated in a loaded electrical state. Offsets may exist between the angle of the electrical fields within the AC machine (e.g., the real or electrical angle) and the rotary sensor positions (e.g., the mechanical angle). Such offsets may occur, for example, because of various electrical and/or mechanical characteristics of the AC machine 12 and other components of the hybrid machine system 10, including manufacturing or component tolerance variations, torque-induced bending of the rotor shaft 32, and/or positional misalignments of the wheel 34. Offsets of these types may detrimentally impact the performance of the hybrid machine system 10 and the application, such as a vehicle, into which the hybrid machine system is incorporated.

Figure 3:
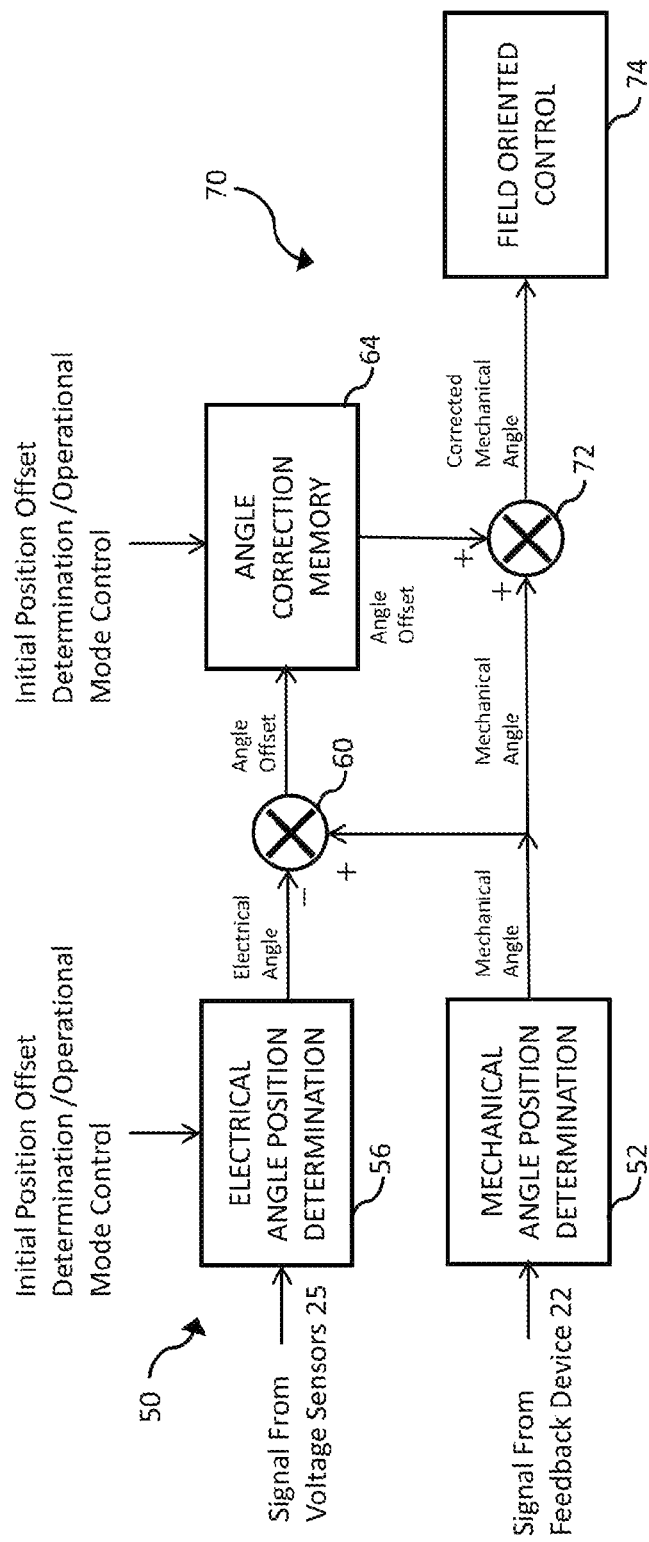
FIG. 3 is a diagrammatic illustration of methods by which the machine control system shown in FIG. 1 can operate, in accordance with embodiments.

FIG. 3 diagrammatically illustrates an initial position offset determination method 50 that can be performed by the machine control system 20 in connection with the correction or compensation of the rotor position offsets such as those described above, in accordance with embodiments. The method 50 may be performed during an initial position offset determination mode, while the AC machine 12 is driven by the engine 14 and operating in an unloaded electrical state (e.g., when the inverter 18 is switched Off). As shown, method 50 uses as inputs the rotor position/speed signals produced by the feedback device 22 (e.g., the signal 40 produced by Hall sensor 30 and described in connection with FIG. 2) and the motor voltage signals provided by the voltage sensors 25.

Figure 4:
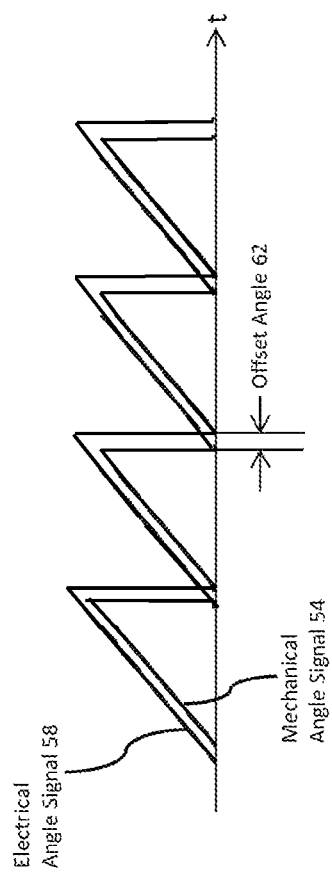
FIG. 4 is a diagrammatic illustration of electrical angular position signals and mechanical angular position signals produced by the machine control system shown in FIG. 1, in accordance with embodiments.

At step 52, the machine control system 20 determines a mechanical angular position of the AC machine 12 based on the feedback signals from the feedback device 22. In embodiments, the angular position offset determination step 52 is performed while the machine control system 20 causes the inverter 18 to be switched Off and the AC machine 12 is operated in the unloaded electrical state. A diagrammatic illustration of mechanical angular position signals 54 that may be produced by the machine control system 20 at step 52 is shown in FIG. 4. Although shown with respect to time (t) on the horizontal axis in FIG. 4, the angular position signals 54 are also representative of the rotational angular position of the rotor shaft 32. Conventional or otherwise known approaches can be used by the machine control system 20 to generate the mechanical angular position signals such as 54 from the signals provided by the feedback device 22. For example, a timer may be reset upon the detection of the index 44 and/or by counting the pulses 42.

At step 56, the method 50 causes the inverter 18 to switch Off and operate in the unloaded electrical state, and to determine the electrical angular positions of the AC machine 12 based on the feedback signals provided by the voltage sensors 25. A diagrammatic illustration of electrical angular position signals 58 that may be produced by the machine control system 20 at step 56 is shown in FIG. 4. In embodiments, the electrical angular position signals are effectively the BEMF angles in the AC machine 12. Although shown with respect to time (t) on the horizontal axis in FIG. 4, the angular position signals 58 are also representative of the angular positions or phases of the electrical signals. Conventional or otherwise known approaches can be used by the machine control system 20 to generate the electrical angular position signals such as 58 from the signals provided by the voltage sensors 25. For example, electrical angular positions can be determined from the signals provided by the voltage sensors 25 by phased lock loop (PLL) approaches or other algorithms.

At step 60 the method 50 determines an offset or difference between the mechanical angular positions and the electrical angular positions of the AC machine 12 while the AC machine is operating in the unloaded electrical state. In embodiments, machine control system 20 determines the offset between the position of the mechanical Hall sensor 30 and electrical angular positions based on the mechanical angular position signals such as 54 and the electrical angular position signals such as 58 produced at steps 52 and 56, respectively. A diagrammatic illustration of an offset 62 that may be produced by the machine control system 20 at step 60 is shown in FIG. 4. Although shown with respect to time (t) on the horizontal axis in FIG. 4, the offset 62 is also representative of the angle or phase difference between the mechanical angular position signals 54 based on the signals such as 40 produced by the Hall sensor 30 and the electrical or real rotor angular position signals 58. Conventional or otherwise known approaches can be used by the machine control system 20 to generate the offset 62. For example, a timer can be used to determine the phase difference between the mechanical angular position signals 54 and the electrical angular position signals 58. At step 64, the offset such as 62 determined at step 60 can be stored in memory by the machine control system 20 to complete the initial position offset determination mode operation.

FIG. 3 also diagrammatically illustrates a method 70 that can be performed by the machine control system 20 to use the stored offset such as 62 determined by the method 50 during operating mode operation of the hybrid machine system 10. As shown by step 72, the machine control system 20 generates corrected angular positions, such as a corrected mechanical angular positions, based on the mechanical angular position signals such as 54 determined at step 52, and the offset determined at step 60 and stored at step 64. In the embodiment illustrated in FIG. 4, for example, the corrected angular positions are determined by summing the mechanical angular positions represented by the mechanical angular position signals 54 and the offset stored at step 64. Machine control system 20 then uses the corrected angular positions determined at step 72 as the angular positions of the AC machine 12 during operating mode operation (e.g., while providing field oriented control) as shown by step 74.

Hybrid machine system 10 and methods such as 50 and 70 offer important advantages, especially in embodiments where a single feedback device 22 is used to provide information representative of the mechanical angular positions of the AC machine 12. The single feedback device such as Hall sensor 30 generates digital signal pulses each time the elements 36 pass the sensor. Based on these pulses the machine control system 20 may calculate the speed (frequency) and increment angle of the AC machine 12. Features of the wheel 34 such as the one or more removed or missing elements 36 set or establish an index such as 44 (e.g., zero angle event) which is reset upon the full revolution angle of the wheel and rotor 32 of the AC machine 12, thereby restarting the angle count or determination. Feedback devices 22 such as Hall sensors 30 and the methods such as 50 and 70 that use the feedback signals from the feedback devices are efficient and cost-effective to implement. In embodiments, the wheel 34 need not be assembled onto the rotor shaft 32 at a predetermined position. Hybrid machine system 10 facilitates good machine-engine integration, especially at short powertrain incremental lengths. The disclosed hybrid machine system 10 provides good speed measurement and angle measurement capabilities.

Although described above with the feedback device 22 positioned on or near the AC machine 12 to provide information representative of the mechanical angular positions of the rotor shaft 32 of the AC machine, in other embodiments the feedback device 22 may be located at other positions. For example, the feedback device 22 can be located on or near the engine 14 to provide information directly representative of the rotational positions of the drive shaft of the engine coupled to the rotor shaft 32 of the AC machine 12 (e.g., the engine crank position), which information is also representative of the angular positions of the rotor shaft of the AC machine. In such embodiments an isolated signal splitter may be included to reduce interference between the two subsystems. Yet other embodiments may use more than one (e.g., two) position sensors, for example with one being a sensor on the AC machine 12 and a second on the engine 14 (e.g., to provide redundancy and enhance the single sensor fault migration).

Figure 5:
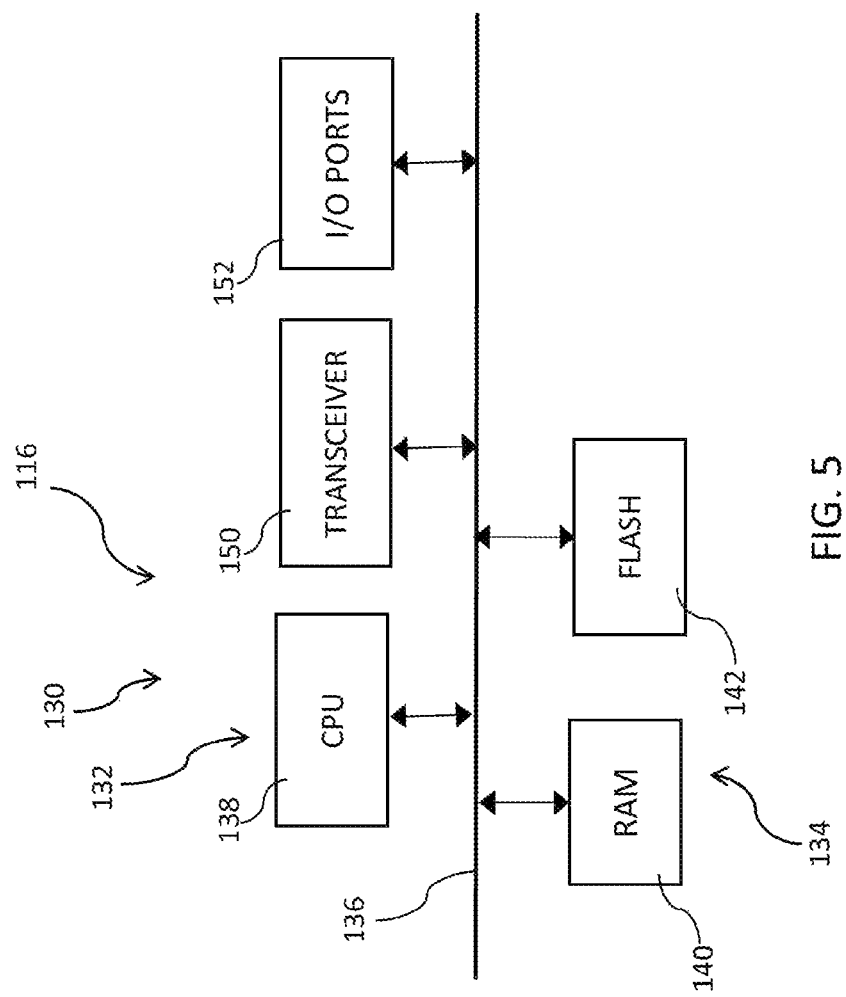
FIG. 5 is a diagrammatic illustration of a computing system environment that can be used to implement the machine control system shown in FIG. 1, in accordance with embodiments.

FIG. 5 is a diagrammatic illustration of exemplary functional components of a computing system environment 116 that can implement machine control system 20 in accordance with embodiments. The illustrated embodiments include a processing system 130 comprising processing components 132 and storage components 134 coupled by a bus 136. Processing components 132 may, for example, include one or more central processing units (CPUs) 138 providing the processing functionality of the machine control system 20. The storage components 134 may include RAM memory 140, ROM or FLASH memory 142 providing the information and other data storage functionality of the system 116. For example, operating system and other software used by the processing components 132 to implement the motor control methods and algorithms, including methods 50 and 70, may be stored in the storage components 134. Components of the processing system 130 can be implemented as programmed microprocessors, application specific integrated circuits (ASICs, FPGA, CPLD, etc.), controllers and/or discrete circuit components. Other embodiments of the processing system 130 are implemented using other conventional or otherwise known systems or devices. The embodiments illustrated in FIG. 1 also include input/output (I/O) ports 152 (which may include mechanical bus connectors, not shown) through which the system environment 116 can receive and transmit information or other data. For example, in embodiments, the feedback device 22 and/or current sensors 24 can be coupled to the processing components 132 through the I/O ports 152.

It is to be understood that the above description is intended to be illustrative, and not restrictive. Many other embodiments will be apparent to those of skill in the art upon reading and understanding the above description. It is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

The invention claimed is:

1. A method for operating a hybrid machine system including an electric machine coupled to an engine and an inverter, comprising:
 operating the hybrid machine system in an offset determination mode while the electric machine is driven by the engine, including:
  receiving mechanical angular position information representative of mechanical angular positions of the electric machine;
  receiving electrical angular position information representative of electrical angular positions of electric signals in the electric machine when the electric machine is operating in an unloaded electrical state;
  determining an offset between the mechanical angular positions and the electrical angular positions based on the mechanical angular position information and the electrical angular position information; and
  storing the offset; and
 operating the hybrid machine system in an operating mode when the electric machine is in a loaded electrical state and driven by the engine, including:
  receiving the mechanical angular position information representative of the mechanical angular positions of the electric machine;
  generating machine control signals based on the mechanical angular position information and the stored offset; and
  applying the machine control signals to the inverter.

2. The method of claim 1, wherein receiving the mechanical angular position information includes receiving information including an index representative of 360° rotation of a rotor of the electric machine with respect to a stator of the electric machine.

3. The method of claim 1, wherein:
 operating the hybrid machine system when the electric machine is in the unloaded electrical state includes switching the inverter off; and
 operating the hybrid machine system when the electric machine is in the loaded electrical state includes controlling the inverter with the machine control signals.

4. The method of claim 1, wherein generating the machine control signals includes generating the machine control signals based on the mechanical angular position signals as the sole signals representative of the mechanical angular positions of the electric machine.

5. The method of claim 4, wherein the machine control signals are produced by a single Hall sensor.

6. A hybrid machine system, comprising:
 an internal combustion engine;
 an AC electric machine coupled to the internal combustion engine;
 an inverter coupling the AC electric machine to a power source or load;
 a first feedback system for providing mechanical angular position information representative of mechanical angular positions of the AC electric machine;
 a second feedback system providing electrical angular position information representative of electrical angular positions of electrical signals in the AC electric machine; and
 a machine control system coupled to the inverter, first feedback system and second feedback system, wherein the machine control system is configured to, while the AC electric machine is driven by the internal combustion engine:
  determine mechanical angular positions of the AC electric machine based on the mechanical angular position information;
  switch the inverter off and determine electrical angular positions of the AC electric machine based on the electrical angular position information when the AC electric machine is in an unloaded electrical state;
  determine and store an offset based on the mechanical angular positions and the electrical angular positions;
  generate machine control information based on the mechanical angular positions and the stored offset; and
  switch the inverter on and operate the electric machine in a loaded electrical state based on the machine control information.

7. The hybrid machine system of claim 6, wherein the first feedback system comprises:
 a rotating member including elements coupled to and rotating with the AC electric machine; and
 a Hall sensor to sense the elements on the rotating member.

8. The hybrid machine system of claim 7, wherein the rotating member is coupled to a rotor of the electric machine.

9. The hybrid machine system of claim 8, wherein the rotating member is mounted to a rotor of the AC electric machine.

10. The hybrid machine system of claim 8, wherein the rotating member is mounted to a crank of the internal combustion engine.

11. The hybrid machine system of claim 7, wherein the rotating member includes an index representative of 360° rotation of the rotating member.

12. The hybrid machine system of claim 6, wherein the first feedback system is a sole system providing mechanical angular position information representative of mechanical angular positions of the AC electric machine.

13. The hybrid machine system of claim 12, wherein the first feedback system comprises a Hall sensor.

14. The hybrid machine system of claim 13, wherein the first feedback system comprises a single Hall sensor.

15. A controller for a hybrid machine system of the type including an AC electric machine coupled to an inverter and an internal combustion engine, the controller configured to:
 determine mechanical angular positions of the AC electric machine based on mechanical angular position information, while the AC electric machine is driven by the internal combustion engine;
 switch the inverter off and determine electrical angular positions of the AC electric machine based on electrical angular position information when the AC electric machine is in an unloaded electrical state, while the AC electric machine is driven by the internal combustion engine;
 determine and store an offset based on the mechanical angular positions and the electrical angular positions, while the AC electric machine is driven by the internal combustion engine;
 generate machine control information based on the mechanical angular positions and the stored offset, while the AC electric machine is driven by the internal combustion engine; and
 switch the inverter on and operate the AC electric machine in a loaded electrical state based on the machine control information, while the AC electric machine is driven by the internal combustion engine.

16. The controller of claim 15, wherein the mechanical angular positions are the sole mechanical angular positions used to generate the machine control information.

17. The controller of claim 16, wherein the mechanical angular position information is based on a signal provided by a Hall sensor.

18. The controller of claim 17, wherein the mechanical angular position information is based on a signal provided by a single Hall sensor.

19. The controller of claim 15, wherein the mechanical angular position information is based on a signal provided by a single Hall sensor.

\* \* \* \* \*